United States Patent
Furuya

(10) Patent No.: US 8,243,822 B2
(45) Date of Patent: Aug. 14, 2012

(54) DATA TRANSFER SCHEME, FRAME SYNCHRONIZATION DEVICE AND DATA TRANSFER METHOD

(75) Inventor: Kotaro Furuya, Tokyo (JP)

(73) Assignee: NEC Corporation, Tokyo (JP)

( * ) Notice: Subject to any disclaimer, the term of this patent is extended or adjusted under 35 U.S.C. 154(b) by 395 days.

(21) Appl. No.: 12/585,437

(22) Filed: Sep. 15, 2009

(65) Prior Publication Data

US 2010/0066907 A1    Mar. 18, 2010

(30) Foreign Application Priority Data

Sep. 18, 2008    (JP) .................................. 2008-238952

(51) Int. Cl.
   *H04N 7/12*    (2006.01)
(52) U.S. Cl. .............................. 375/240.25; 375/240.28
(58) Field of Classification Search ...... 375/240–240.29
   See application file for complete search history.

(56) References Cited

U.S. PATENT DOCUMENTS

| | | | | |
|---|---|---|---|---|
| 5,907,372 A | * | 5/1999 | Oku et al. ..................... | 348/716 |
| 6,078,619 A | * | 6/2000 | Monro et al. ................. | 375/240 |
| 6,477,204 B1 | * | 11/2002 | Fukushima et al. ..... | 375/240.28 |
| 2008/0198270 A1 | * | 8/2008 | Hobbs et al. ................. | 348/708 |

FOREIGN PATENT DOCUMENTS

| | | |
|---|---|---|
| JP | 5-191801 A | 7/1993 |
| JP | 6-334981 A | 12/1994 |
| JP | 10-13825 A | 1/1998 |
| JP | 2001-103486 A | 4/2001 |

* cited by examiner

*Primary Examiner* — Hong Cho
(74) *Attorney, Agent, or Firm* — McGinn IP Law Group, PLLC

(57) ABSTRACT

A data transfer scheme includes at least one decoding unit that receives encoded video data as input, generates frame data by decoding the video data, stores the frame data and updates the stored frame data in response to newly input video data, at least one frame processing unit that stores the frame data decoded by the decoding unit and manipulates the frame data, and a frame synchronization unit that transfers the frame data stored in the decoding unit to the frame processing unit and transfers update data to be used for update of the frame data stored in the frame processing unit to the frame processing unit in response to update of the frame data stored in the decoding unit.

19 Claims, 11 Drawing Sheets

DATA TRANSFER SCHEME, FRAME SYNCHRONIZATION DEVICE AND DATA TRANSFER METHOD

INCORPORATION BY REFERENCE

This application is based upon and claims the benefit of priority from Japanese patent application No. 2008-238952, filed on Sep. 18, 2008, the disclosure of which is incorporated herein in its entirety by reference.

BACKGROUND OF THE INVENTION

1. Field of the Invention

The present invention relates to a transfer scheme of video data and, particularly, to a transfer scheme that reduces the processing load of memory access to store video data.

2. Description of Related Art

In a real-time video processing system, it is necessary not only to simply transmit and receive a video but also to perform manipulation of a video, such as combining a plurality of images, in order to realize various services. In the manipulation of a video, it is necessary to decode encoded video data once and perform processing on non-compressed image data. There are various kinds of manipulation processing depending on users to receive services, and they should be flexibly variable. For this reason, it is difficult to process image data with use of a common device, and therefore image data is generally manipulated with use of techniques according to services. For example, Japanese Unexamined Patent Application Publications Nos. 2001-103486, 5-191801, 6-334981 and 10-13825 disclose related techniques.

FIG. 11 shows an exemplary configuration of a real-time moving image processing system that decodes encoded video data into non-compressed image data (frame data) once and then performs processing on the frame data. The exemplary system includes decoding units 10-0 to 10-P (P is an integer satisfying P>0), frame processing units 11-0 to 11-Q (Q is an integer satisfying Q>0), and frame memories 12-0 to 12-P. A region where the plurality of frame memories 12-0 to 12-P are placed is a shared memory space 13. The number of decoding units and frame memories (P+1) is determined according to the number of input moving image data. The number of frame processing units (Q+1) is determined according to the number of kinds of manipulating frame data.

The decoding units 10-0 to 10-P perform decoding on a plurality of input moving image data 0 to P and output frame data (framed data) to the shared memory space 13. At this time, the decoding units 10-0 to 10-P output the frame data to a previously associated one of the frame memories 12-0 to 12-P included in the shared memory space 13.

The frame memories 12-0 to 12-P store the frame data that are generated by decoding the input moving image data 0 to P in the decoding units 10-0 to 10-P.

The frame processing units 11-0 to 11-Q select and refer to a given frame memory of the frame memories 12-0 to 12-P in the shared memory space 13 and perform frame processing thereon. The "frame processing" is to perform manipulation processing on the decoded frame data according to a service. The processing includes re-encoding such as image composition or image size change, for example.

In the system shown in FIG. 11, the frame memories 12-0 to 12-P are used both by the decoding units 10-0 to 10-P and the frame processing units 11-0 to 11-Q. Specifically, the decoding units 10-0 to 10-P write the frame data into the corresponding frame memories 12-0 to 12-P in the shared memory space 13. On the other hand, the frame processing units 11-0 to 11-Q read the frame data stored in the frame memories 12-0 to 12-P. Therefore, the frame memories 12-0 to 12-P need to exist in the shared memory space 13 that is accessible by both units.

Consider, for example, the case of broadcasting one input moving image data in a system that performs different frame processing on frame data according to users to receive distribution, regarding the system configuration shown in FIG. 11. A specific example is broadcasting moving image data of a videoconference to every user.

In this case, the frame processing units 11-0 to 11-Q distribute the input moving image data 0, for example, after performing manipulation according to each user. Specifically, the input moving image data 0 is decoded by the decoding unit 10-0 and output to the frame memory 12-0. Then, all the frame processing units 11-0 to 11-Q refer to the frame data stored in the frame memory 12-0. Likewise, the other input moving image data 1 to P are decoded by the decoding units 10-1 to 10-P and output. Then, the frame processing units 11-0 to 11-Q refer to the frame memories 12-1 to 12-P.

In the system as shown in FIG. 11, the decoding units 10-0 to 10-P output the decoded frame data to the frame memories 12-0 to 12-P. On the other hand, the frame processing units 11-0 to 11-Q refer to the frame memories 12-0 to 12-P included in the shared memory space 13. Therefore, access competition to the frame memories 12-0 to 12-P occurs between the decoding units 10-0 to 10-P and the frame processing units 11-0 to 11-Q. Thus, when either one of the decoding units 10-0 to 10-P or the frame processing units 11-0 to 11-Q access the frame memories 12-0 to 12-P, the other units are in a wait state, causing a delay in processing.

Further, in the case where the frame processing units 11-0 to 11-Q operate independently of one another, the plurality of frame processing units 11-0 to 11-Q simultaneously refer to the same frame memory 12-0 to 12-P in some cases, which causes a wait for acquiring the frame data stored in the frame memory 12-0 to 12-P. Therefore, access competition to the frame memory 12-0 to 12-P occurs between the plurality of frame processing units 11-0 to 11-Q. This affects the performance of frame processing.

As described above, there is an issue that processing load occurs due to access competition to the frame memories 12-0 to 12-P in the shared memory space 13.

SUMMARY

An exemplary object of the invention is to provide a technique of reducing the processing load for accessing video data in a system using video data.

A data transfer scheme according to an exemplary aspect of the invention includes at least one decoding unit that receives encoded video data as input, generates frame data by decoding the video data, stores the frame data and updates the stored frame data in response to newly input video data; at least one frame processing unit that stores the frame data decoded by the decoding unit and manipulates the frame data; and a frame synchronization unit that transfers the frame data stored in the decoding unit to the frame processing unit and transfers update data to be used for update of the frame data stored in the frame processing unit to the frame processing unit in response to update of the frame data stored in the decoding unit.

A frame synchronization device according to an exemplary aspect of the invention is a frame synchronization device that transfers frame data between a decoding device that receives encoded video data as input, generates frame data by decoding the video data and stores the frame data and a frame processing device that stores the frame data decoded by the decoding device and manipulates the frame data, and the frame synchronization device transfers the frame data stored in the decoding device to the frame processing device, detects update of the frame data stored in the decoding device in response to video data newly input to the decoding device, and transfers update data to be used for update of the frame data stored in the frame processing device to the frame processing device in response to a detected update status.

A data transfer method according to an exemplary aspect of the invention includes storing frame data generated by decoding encoded video data into a first memory, updating the frame data stored in the first memory in response to newly input video data, transferring the frame data stored in the first memory to a second memory different from the first memory, manipulating the frame data stored in the second memory, and transferring update data to be used for update of the frame data stored in the second memory to the second memory in response to update of the frame data stored in the first memory.

A recording medium according to an exemplary aspect of the invention is a computer-readable recording medium that records a program to implement frame synchronization processing that transfers frame data between a decoding device that receives encoded video data as input, generates frame data by decoding the video data and stores the frame data and a frame processing device that stores the frame data decoded by the decoding device and manipulates the frame data, and the program causes a computer to execute processing including transferring the frame data stored in the decoding device to the frame processing device, detecting update of the frame data stored in the decoding device in response to video data newly input to the decoding device, and transferring update data to be used for update of the frame data stored in the frame processing device to the frame processing device in response to a detected update status.

BRIEF DESCRIPTION OF THE DRAWINGS

The above and other aspects, features, and advantages of the present invention will become more apparent from the following description of certain exemplary embodiments when taken in conjunction with the accompanying drawings, in which.

EXEMPLARY EMBODIMENT

Figure 1:
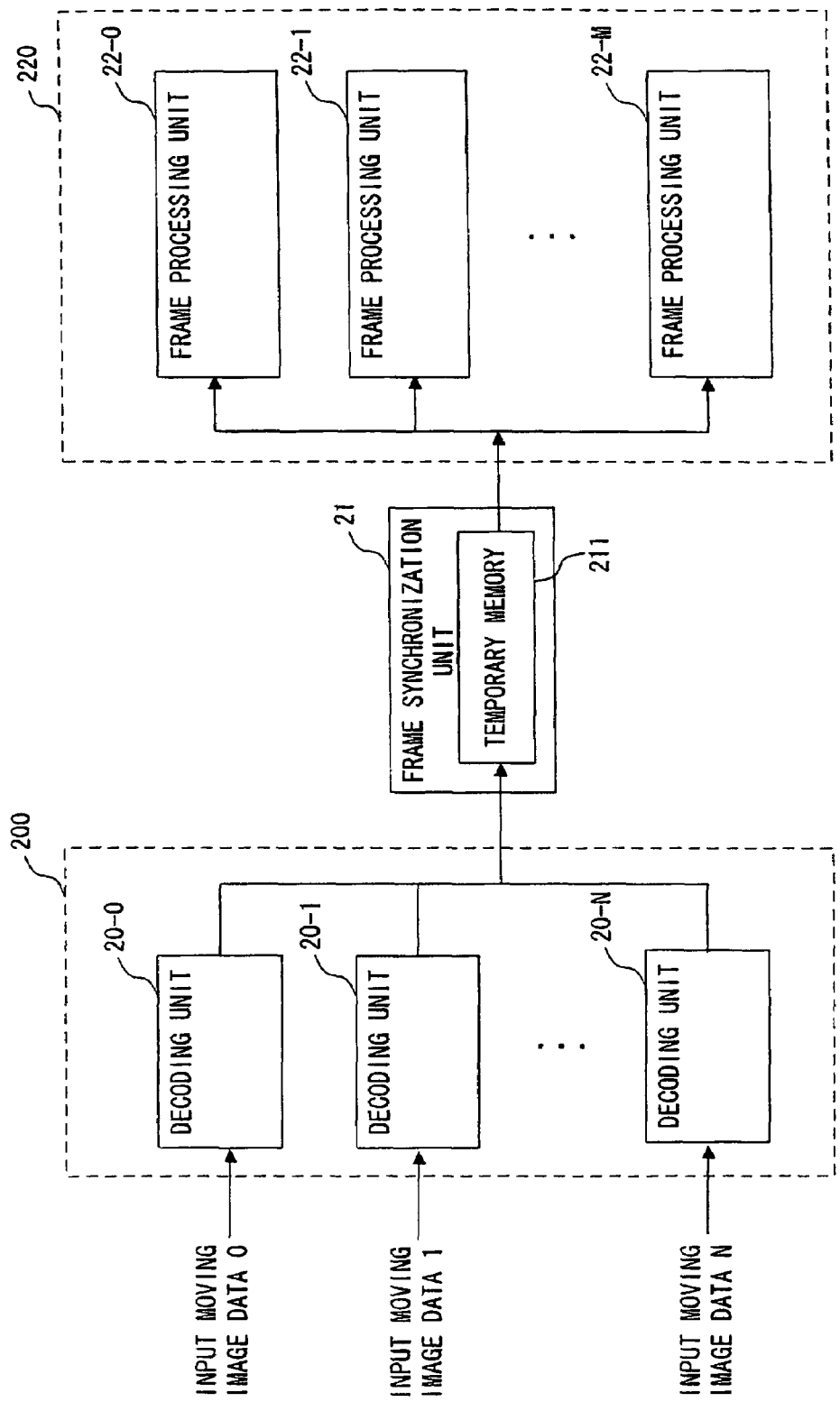
FIG. 1 is a block diagram showing an exemplary configuration of a data transfer scheme according to a first exemplary embodiment of the present invention.

Exemplary embodiments of the present invention will be described hereinafter with reference to the drawings. The following description and the attached drawings are appropriately shortened and simplified to clarify the explanation. In the drawings, the structural elements and equivalents having an identical structure or function are denoted by the identical reference symbols, and the redundant explanation thereof is omitted. Further, in the following description, a plurality of identical structural elements are distinguished, where necessary, by adding "-n" (n is an integer satisfying n≧0) to the reference symbol. For example, FIG. 1 shows a plurality of decoding units 20-0, 20-1, . . . , and 20-N (N>0). In the description with reference to FIG. 1, a decoding unit 20 indicates any one or a plurality of the plurality of decoding units 20-0 to 20-N, and a decoding unit 20-0 (or a decoding unit 20-1 etc.) indicates each of the plurality of decoding units in distinction from one another.

It is assumed in the following description that input moving image data (which is also referred to as video data) is encoded digital data. Further, output moving image data is digital data generated by performing frame processing (manipulation processing) on the decoded input moving image data.

[First Exemplary Embodiment]

FIG. 1 is a block diagram showing an exemplary configuration of a data transfer scheme according to a first exemplary embodiment of the present invention. The data transfer scheme is applicable to a moving image processing system that receives encoded moving image data, manipulates frame data obtained by decoding the moving image data and distributes the frame data in real-time, for example.

The data transfer scheme shown in FIG. 1 includes decoding units 20-0 to 20-N (N is an integer satisfying N>0), a frame synchronization unit 21 and frame processing units 22-0 to 22-M (M is an integer satisfying M>0). The decoding units 20-0 to 20-N as a whole are also referred to as a data decoding processing section 200. Further, the frame processing units 22-0 to 22-M as a whole are also referred to as a manipulation processing section 220.

The decoding unit 20 receives input moving image data, decodes the input moving image data to generate frame data, and stores the frame data into their own storage area. Then, the decoding unit 20 stores update status (frame update information) for updating the stored frame data in response to input moving image data that is newly input. The decoding unit 20 is prepared corresponding to the number of input moving image data. The data transfer scheme shown in FIG. 1 includes the same number of decoding unit 20 as the number of input moving image data. The number of decoding unit 20 is at least the number of input moving image data, and it may be larger; specifically, the number of decoding unit 20 may be larger than (N+1). In this case, it is possible to deal with an increase in the number of input moving image data. The decoding units 20-0 to 20-N are in one-to-one correspondence with the input moving image data 0 to N. The decoding units 20-0 to 20-N identify the input moving image data to input and process with use of an identifier (which is also referred to as "frame identifier" or "moving image identifier")

. The identifier is given in one-to-one relationship with the input moving image data. Thus, the identifier has one-to-one relationship with each decoding unit 20 and the frame data decoded by each decoding unit 20.

Figure 2:
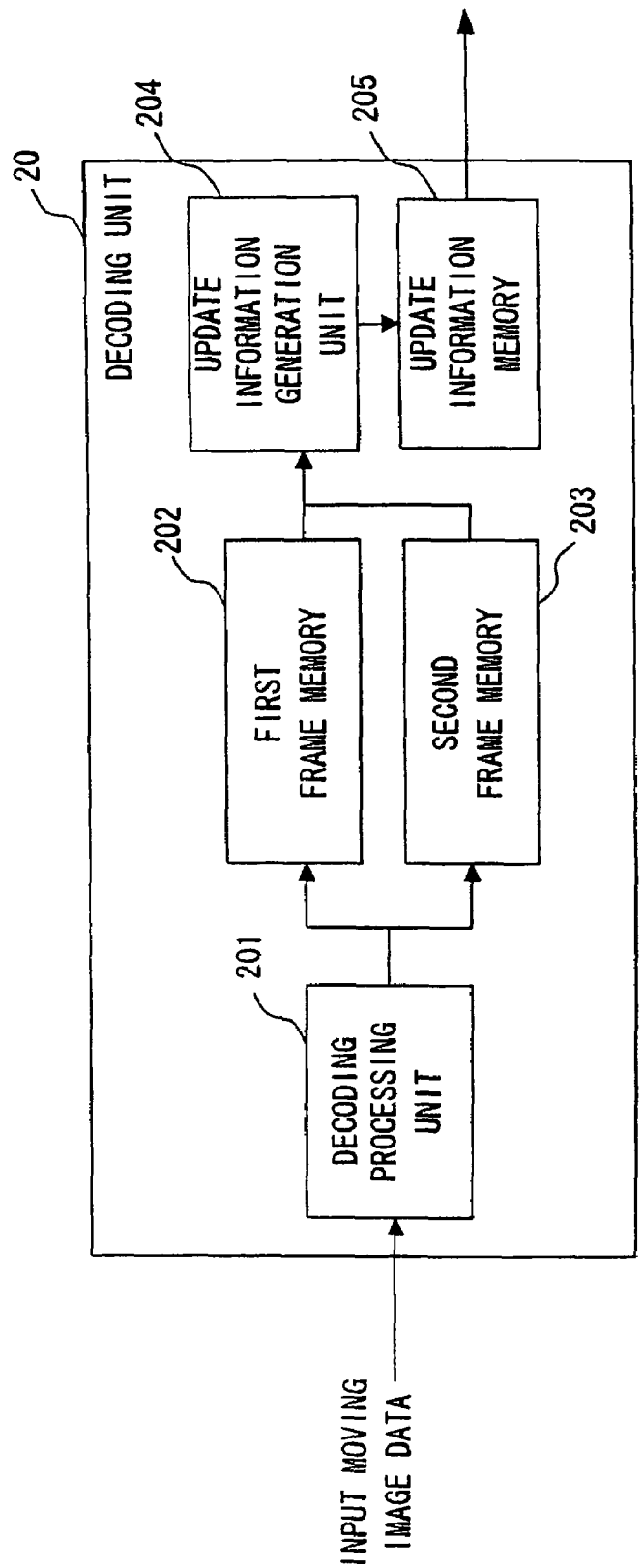
FIG. 2 is a block diagram showing an exemplary configuration of a decoding unit.

FIG. 2 shows an exemplary configuration of the decoding unit 20. The decoding unit 20 includes a decoding processing unit 201, a first frame memory 202, a second frame memory 203, an update information generation unit 204, and an update information memory (frame update information memory) 205.

The decoding processing unit 201 decodes encoded input moving image data to generate frame data, and then updates the frame data stored in the first frame memory 202 or the second frame memory 203 located in its local memory.

The first frame memory 202 and the second frame memory 203 are areas for storing the frame data, and they store the latest frame data and the frame data decoded just previously in an alternate manner. Specifically, they store the latest frame data into the memory in which data has not been written last time. In the following description, the two frame data are distinguished by referring to the frame data obtained by decoding the input moving image data that is newly input as "latest frame data" and referring to the frame data obtained by decoding the input moving image data that is input just previously as "previous frame data".

The update information generation unit 204 compares the latest frame data with the previous frame data and generates frame update information based on a comparison result. In this exemplary embodiment, the case of performing differential extraction by using the latest frame data and the previous frame data, performing encoding and compression of difference information and updating the frame update information is described as an example. In the case of generating the frame update information by means of differential extraction as in this exemplary embodiment, the term "update information generation unit" is sometimes replaced by a "differential coding unit" in order to clarify the function. Because the update information generation unit 204 performs differential extraction by differential coding, the decoding unit 20 needs two or more areas of frame memory, i.e. the first frame memory 202 and the second frame memory 203.

The update information memory 205 stores the frame update information generated by the update information generation unit 204. The frame update information stored in the update information memory 205 is read by the frame synchronization unit 21. Thus, the update information generation unit 204 performs writing to the update information memory 205 in a procedure that avoids access competition with reading by the frame synchronization unit 21.

The frame processing unit 22 stores the frame data decoded by the decoding unit 20 into its own storage area, manipulates the frame data, generates output moving image data and outputs the data. Further, when the frame data stored in the decoding unit 20 is updated, the frame processing unit 22 updates the frame data stored in its own storage area by using the frame update information generated by the decoding unit 20. The frame processing unit 22 is prepared corresponding to the number of output moving image data. Specifically, the same number of frame processing unit 22 as the number of kinds of specifications (formats) for manipulation of the decoded frame data is required. FIG. 1 shows the case of including the (M+1) number of frame processing unit 22. Further, each frame processing unit 22 needs a storage area for storing the (N+1) number of frame data. Specifically, the frame processing unit 22 includes the storage area that stores the frame data of the same number as or a larger number than the larger one of the number of input moving image data and the number of decoding unit 20.

Figure 3:
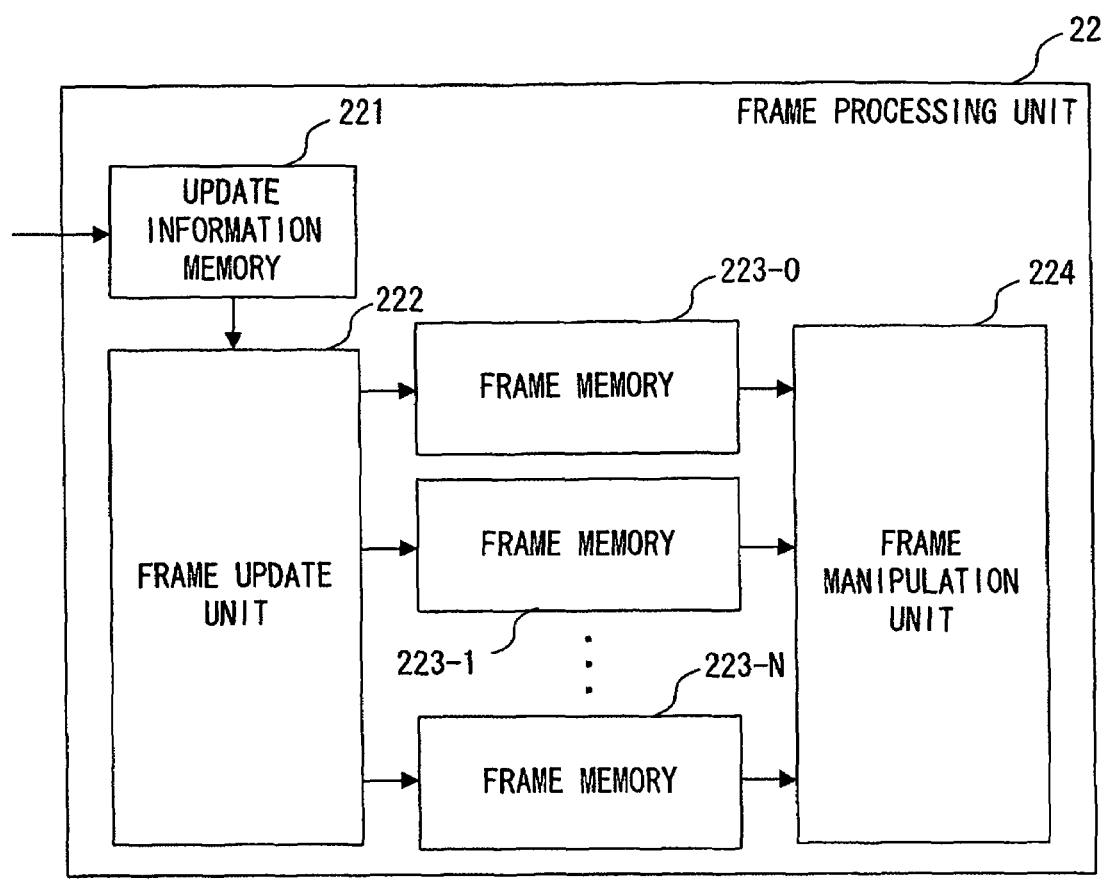
FIG. 3 is a block diagram showing an exemplary configuration of a frame processing unit.

FIG. 3 shows an exemplary configuration of the frame processing unit 22. The frame processing unit 22 includes an update information memory 221, a frame update unit 222, frame memories 223-0 to 223-N (N is an integer satisfying N>0), and a frame manipulation unit 224. The number (N+1) of frame memories is the same as the number of decoding unit 20.

The update information memory 221 stores the frame update information generated by the decoding unit 20.

The frame update unit 222 updates the frame data stored in the frame memory 223 based on the frame update information stored in the update information memory 221. In this exemplary embodiment, the update information generation unit 204 in the decoding unit 20 generates the frame update information by performing differential extraction and then encoding and compressing difference information. Thus, the frame update unit 222 reconstructs the frame data from the differentially encoded data contained in the frame update information and updates the frame data in its own storage area. In the case of reconstructing the frame data by using the frame update information containing difference information as in this exemplary embodiment, the term "frame update unit" is sometimes replaced by a "frame reconstruction unit" in order to clarify the function.

The frame memories 223-0 to 223-N are storage areas that store the frame data decoded by the decoding unit 20. The frame memory 223 needs the storage areas of the same number as or a larger number than the number of input moving image data in order to enable reference to the frame data generated by decoding all input moving image data. In the configuration of FIG. 1, the frame processing unit 22 needs to include the frame memory 223 of the same number as or a larger number than N+1.

The frame manipulation unit 224 manipulates the frame data stored in the frame memory 223 into desired specifications to thereby generate output moving image data and outputs the generated output moving image data.

The frame synchronization unit 21 transfers the frame data stored in the decoding unit 20 to the frame processing unit 22. Further, the frame synchronization unit 21 transfers the frame update information that is used for update of the frame data stored in the frame processing unit 22 to the frame processing unit 22 in response to update of the frame data stored in the decoding unit 20. In this exemplary embodiment, the frame synchronization unit 21 refers to the frame update information stored in the update information memory 205 of each decoding unit 20 and establishes synchronization with the frame update information stored in the update information memory 221 of each frame processing unit 22. The frame synchronization unit 21 includes a temporary memory 211 that acquires the frame update information from the decoding unit 20 and temporarily stores the frame update information. Further, the frame synchronization unit 21 acquires the frame update information from the frame processing unit 22 according to need and stores it into the temporary memory 211. The function of the frame synchronization unit 21 is described in detail later in the explanation of the operation.

Figure 4:
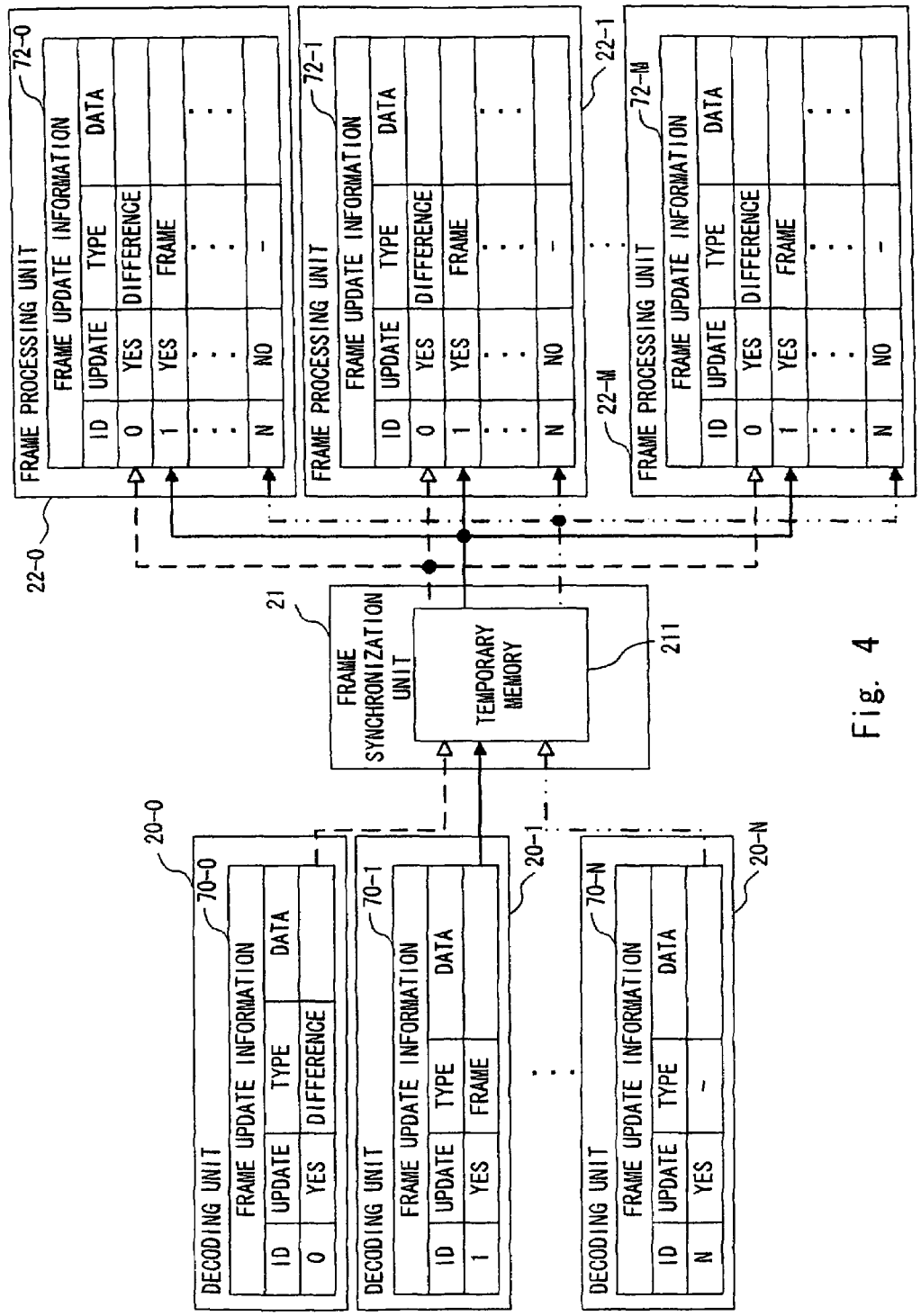
FIG. 4 is a view showing an example of frame update information.

FIG. 4 shows an example of the frame update information. The frame update information stored in the decoding unit 20 and the frame processing unit 22 is information table as shown in FIG. 4. In FIG. 4, the frame update information stored in the update information memory 205 included in the decoding units 20-0 to 20-N are respectively denoted by the symbols 70-0 to 70-N. Further, the frame update information stored in the update information memory 221 included in the frame processing units 22-0 to 22-M are respectively denoted by the symbols 72-0 to 72-M.

The frame update information contains the items "identifier", "update status", "type", and "data (update data)". The "identifier" and "update status" are respectively abbreviated as "ID" and "update" in FIG. 4 and FIG. 10, which is described later. Those elements are described hereinafter.

The item "identifier" is used to identify the corresponding frame update information in the decoding unit 20 and the frame processing unit 22. The identifier is assigned in association with the input moving image data.

The item "update status" is used to determine whether the frame update information is updated or not. Whether the frame update information is updated can be determined based on whether the update status indicates "Yes" (e.g. High) or "No" (e.g. Low).

The item "type" is used to identify whether the updated data is difference information or frame information. The type is described later.

The item "data" is data transferred from the decoding unit to the frame processing unit, and difference information or frame information is contained therein. In FIG. 4, an area to store data is indicated by a blank field, and display of data descriptions is omitted. Further, in this exemplary embodiment, it is assumed that the "data" is valid when the "update status" is Yes and invalid when it is No. This eliminates the need to clear the data when the "update status" is No.

In this description, if the names of the elements included in the decoding unit 20 and the frame processing unit 22 are the same, they are distinguished by adding the prefix "decoding-side" or "processing-side" where necessary. For example, the elements are distinguished by the term "decoding-side update information memory", "processing-side frame memory" or the like. Further, the first frame memory 202 and the second frame memory 203 included in the decoding unit 20 are collectively referred to as a "decoding-side frame memory" where necessary.

Figure 5:
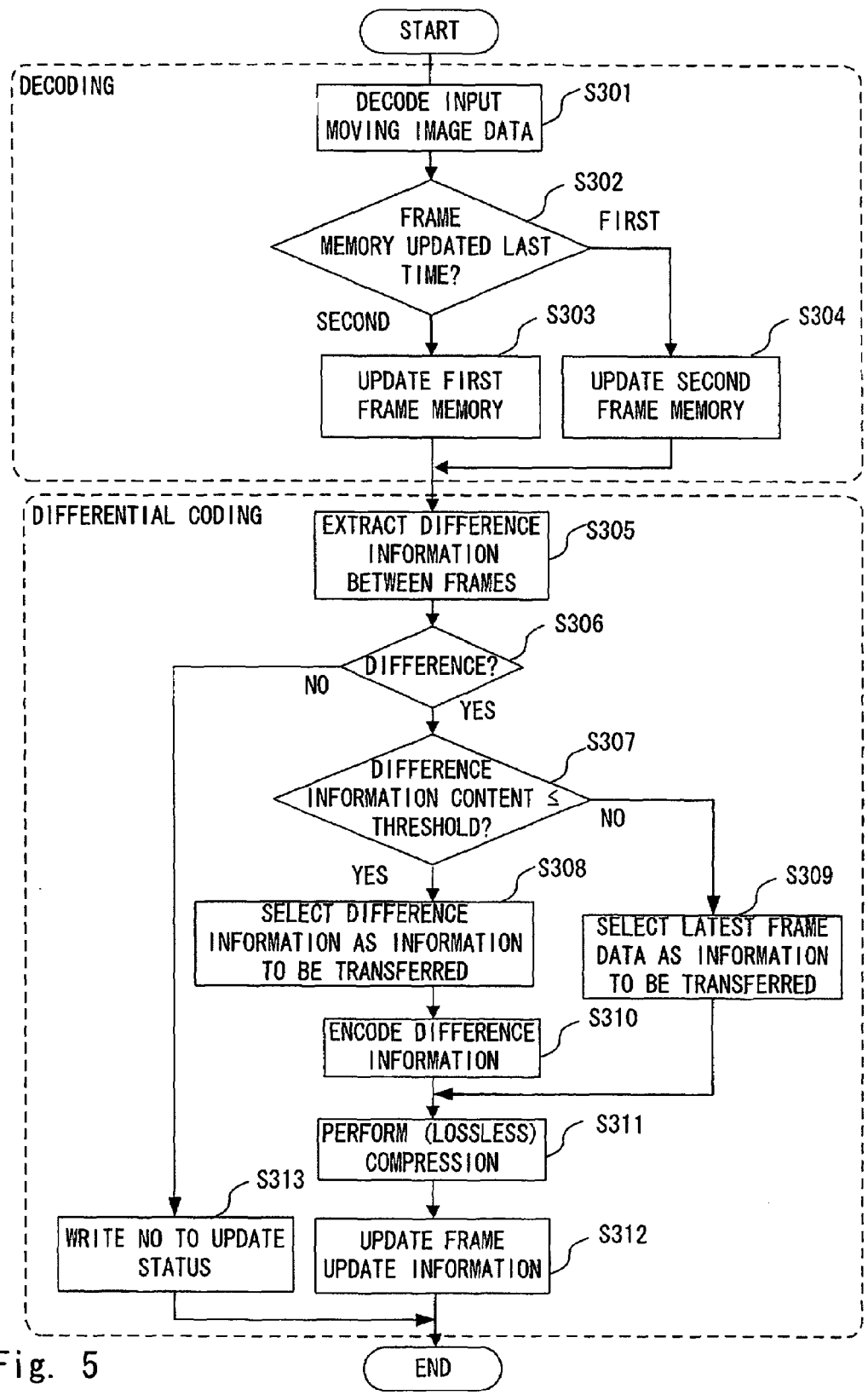
FIG. 5 is a flowchart showing an exemplary operation of a decoding unit according to the first exemplary embodiment.
Figure 6:
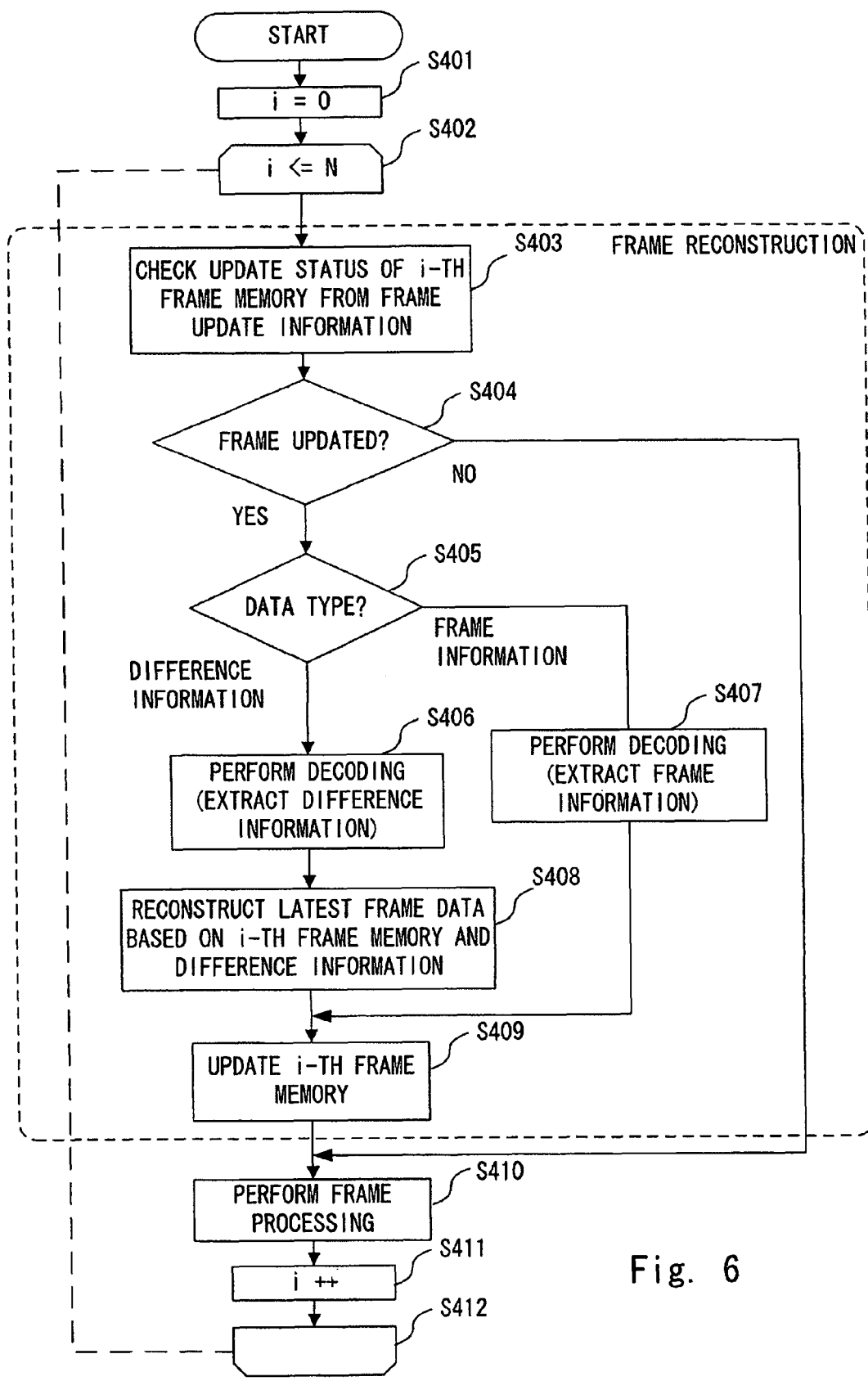
FIG. 6 is a flowchart showing an exemplary operation of a frame processing unit according to the first exemplary embodiment.
Figure 7:
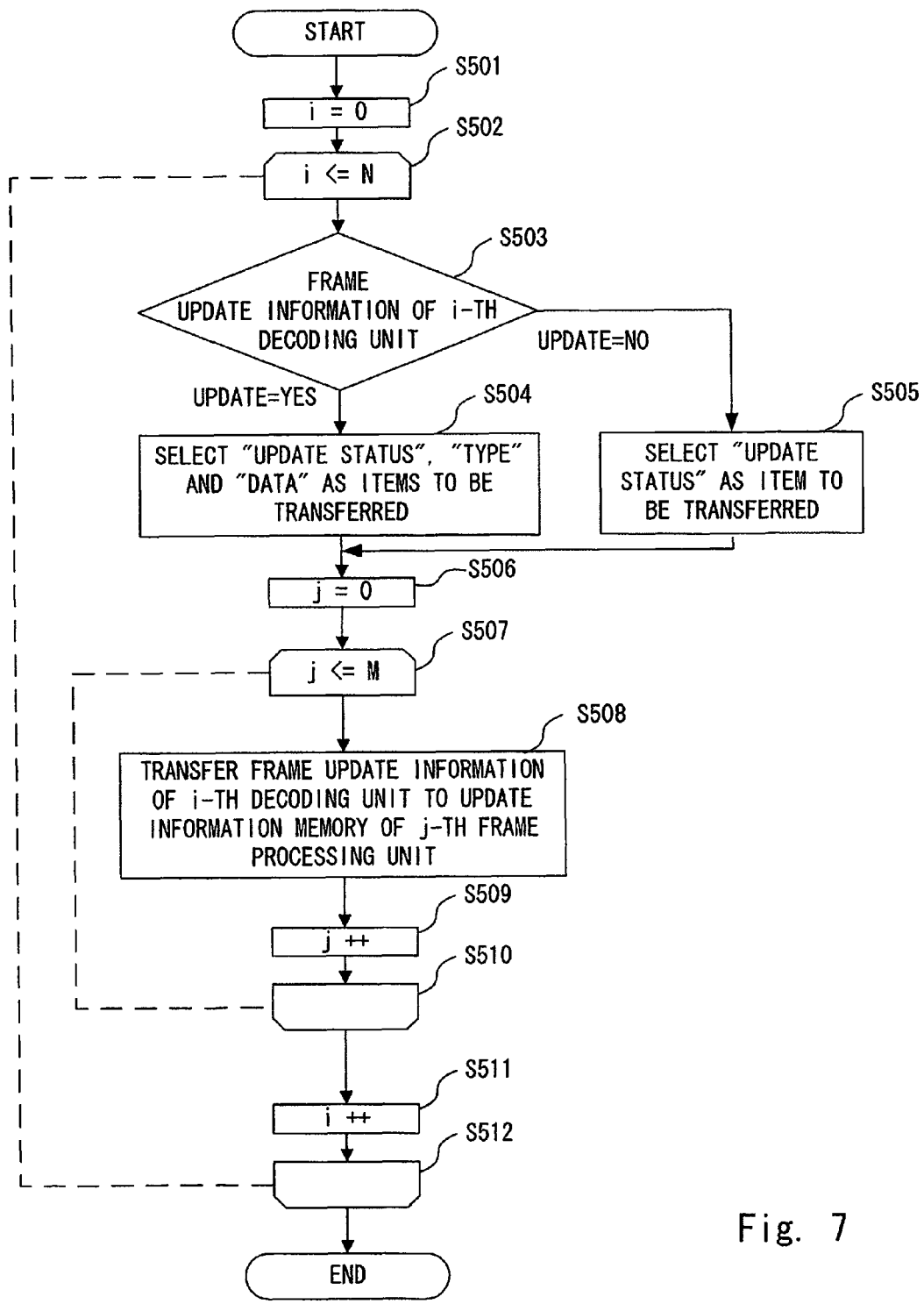
FIG. 7 is a flowchart showing an exemplary operation of a frame synchronization unit according to the first exemplary embodiment.

The operation is described in detail with reference to FIGS. 1 to 7. FIG. 5 is a flowchart showing an example of the operation of the decoding unit 20 according to the first exemplary embodiment. FIG. 6 is a flowchart showing an example of the operation of the frame processing unit 22 according to the first exemplary embodiment. FIG. 7 is a flowchart showing an example of the operation of the frame synchronization unit 21 according to the first exemplary embodiment. Firstly, the operational flow of the decoding unit 20 is described with reference to FIGS. 2 and 5.

The decoding processing unit 201 decodes the input moving image data and generates the latest frame data (S301). Then, the decoding processing unit 201 determines the frame memory area that is updated last time (S302). For example, the decoding processing unit 201 determines the frame memory to be updated next time by holding a flag indicating which of the first frame memory 202 and the second frame memory 203 is used and updating the flag after writing the latest frame data to the frame memory. The decoding processing unit 201 then writes the latest frame data into the frame memory which is not the area updated last time and thereby updates the frame data (S303, S304).

Next, the update information generation unit 204 extracts difference information by calculating a frame difference between the previous frame data updated last time and the latest frame data updated this time in consideration of special correlation (S305). The update information generation unit 204 then determines the presence or absence of a difference (S306). If there is no difference (No in S306), the update information generation unit 204 sets the "update status" to No (S313) and ends the process. If, on the other hand, there is a difference (Yes in S305), the update information generation unit 204 determines whether a difference information content is within a given threshold (S307).

Figure 8:
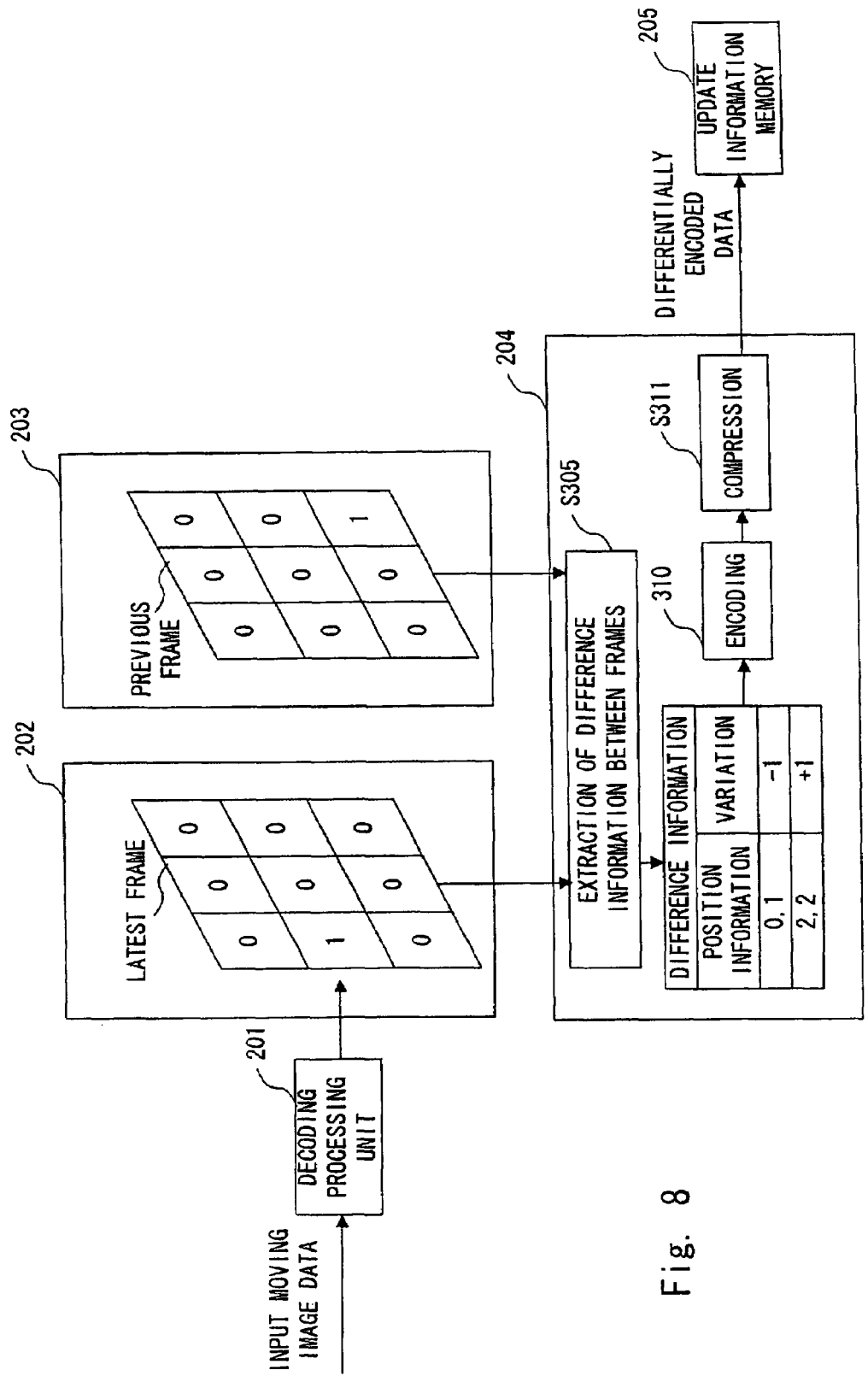
FIG. 8 is a view showing an example of processing of a decoding unit.

If the difference information is within the given threshold (Yes in S307), the update information generation unit 204 selects the difference information as information to be transferred (S308) and performs variable-length coding of the difference information (S310). For example, the update information generation unit 204 performs entropy coding and then performs lossless compression of the difference information (S311). If there is a local frame variation, for example, information that extracts only a variational image peripheral part is obtained. FIG. 8 shows an image that simplifies the differential extraction processing. FIG. 8 shows the case where the latest frame data is stored in the first frame memory 202 and the previous frame data is stored in the second frame memory 203 by way of illustration.

On the other hand, if the difference information is significantly large (larger than the threshold) (No in S307), the update information generation unit 204 performs lossless compression of only the latest frame data (as a still image) (S311). Because relatively heavy computations are necessary for the lossless compression, it is feasible to make transfer information non-compressed information by trade-off between specifications of a computing unit and a transmission band.

After that, the update information generation unit 204 writes the information compressed in the step S311 as the latest frame update information into the update information memory 205 in the decoding unit 20 and thereby updates the frame update information (S312). As described above with reference to FIG. 5, the decoding processing unit 201 performs decoding processing in the steps S301 to S304, and the update information generation unit 204 performs differential coding processing (update information generation processing) in the steps S305 to S312.

The operational flow of the frame processing unit 22 is described hereinafter with reference to FIGS. 3 and 6. A variable i (i is an integer satisfying 0≦i≦N) in FIG. 6 indicates the frame memory 223 to be processed. Thus, the variable i is associated with the identifier. In FIG. 6, an initial value of zero is set to the variable i (S401). If the variable i is equal to or smaller than N, the process repeats the processing of the steps S402 to S412. The variable i may be associated like the input moving image data i, the decoding unit 20-i, the frame memory 223-i or the like with the elements of FIGS. 1 to 3, for example.

The frame update unit 222 acquires the "update status" of the frame update information stored in the update information memory 221 according to the identifier associated with the frame memory 223 (S403) and determines whether update is done or undone (S404). If the update is not done (No in S404), there is no need to update the frame memory, and thus the process continues to perform the frame processing (S410). If, on the other hand, the update is done (Yes in S404), the frame update unit 222 determines the type of data transferred from the decoding unit 20 which is contained in the frame update information by referring to the "type" contained in the frame update information (S405).

If the type is "difference" information, the transferred data is information generated by encoding the difference information in the decoding unit 20. Thus, the frame update unit 222 performs variable-length coding of the transferred data (S406), reconstructs the latest frame data based on the difference information and the frame data stored in the frame memory 223 of its own (S408), and then updates the frame memory 223 with the latest frame data.

On the other hand, if the type is "frame" information, the transferred data is information generated by performing lossless compression of the updated frame only as a result of determination that the frame difference information exceeds the threshold in the decoding unit 20. Thus, the frame update unit 222 performs variable-length coding of the transferred data (S407), and then updates the frame memory 223 with decoded data (the latest frame data) (S409).

The type is not limited to "difference" and "frame", and the way of encoding the transfer data may be changed according to system load conditions or the like by increasing the pattern.

The frame manipulation unit 224 performs frame processing of the frame data stored in the updated frame memory (S410). The above-described series of processing is performed repeatedly the same number of times as the number of frame memories (S411 and S412). Specifically, the frame processing unit 22 updates the frame data stored in the i-th frame memory 223 based on the frame update information held by the i-th decoding unit 20 by counting up the variable i from 0 to N. As described above with reference to FIG. 6, the frame update unit 222 performs frame reconstruction processing (frame update processing) in the steps S403 to S409.

The operational flow of the frame synchronization unit 21 is described hereinafter with reference to FIG. 7. The variable i ($0 \leq i \leq N$) in FIG. 7 is also associated with the identifier as in FIG. 6. In FIG. 7, an initial value of zero is set to the variable i (S501). If the variable i is equal to or smaller than N, the process repeats the processing of the steps S502 to S512. Further, the variable j in FIG. 7 (j is an integer satisfying $0 \leq j \leq M$) indicates the frame processing unit 22 to be processed. In FIG. 7, an initial value of zero is set to the variable j (S506). If the variable j is equal to or smaller than M, the process repeats the processing of the steps S507 to S510. The variable j is associated like the frame processing unit 22-j.

The frame synchronization unit 21 reads the frame update information stored in each of the decoding units 20-0 to 20-N, stores the information into the temporary memory 211 of its own, and determines the "update status" based on the frame update information (S503). If the "update status" is Yes, the frame synchronization unit 21 selects the "update status", "type" and "data" of the frame update information as information to be transferred. If, on the other hand, the "update status" is No, the frame synchronization unit 21 selects the "update status" of the frame update information as information to be transferred. The frame synchronization unit 21 generates transfer data (update information to be transferred) made up of the items selected as information to be transferred in the temporary memory 211 (S504, S505).

The frame synchronization unit 21 then transfers the transfer data to the frame update information with the corresponding identifier in the update information memory 221 included in each of the frame processing units 22-0 to 22-M (S506 to S508). Specifically, the frame synchronization unit 21 counts up the variable j from 0 to M. The transfer data generated based on the frame update information held by the i-th decoding unit 20 is thereby written to the respective update information memory 221 in the frame processing unit 22 (S508). Further, the frame synchronization unit 21 counts up the variable i from 0 to N and thereby reflects the frame update information held by the i-th decoding unit 20 onto the update information memories 221 in the respective frame processing unit 22. Specifically, the frame update information stored in the update information memory 221 is updated according to the identifier associated with the frame update information held by the i-th decoding unit 20.

FIG. 4 shows an example of the situation where the frame synchronization unit 21 updates the frame update information. FIG. 4 shows the case where the "update status" of the frame update information 70-0 and 70-1 of the decoding units 20-0 and 20-1 is Yes and the frame data is updated, and the "update status" of the frame update information 70-N of the decoding unit 20-N is No. Further, the "type" of the decoding unit 20-0 is "difference" information, and the "type" of the decoding unit 20-1 is "frame" information. Such information is reflected on the frame update information 72-0 to 72-M of all the frame processing unit 22. In FIG. 4, transfer of the transfer data based on the frame update information 70-0 is indicated by a dotted line. Likewise, transfer of the transfer data based on the frame update information 70-1 is indicated by a solid line, and transfer of the transfer data based on the frame update information 70-N is indicated by a chain double-dashed line. As shown in FIG. 4, the frame update information 70-0 to 70-N held by the respective decoding unit 20 are respectively reflected on the frame update information 72-0 to 72-M in the respective frame processing unit 22.

In this manner, the frame synchronization unit 21 executes the serial processing shown in FIG. 7 at regular cycles, thereby enabling synchronization of the frame memory without competition of access to the frame data between the decoding unit 20 and the frame processing unit 22. Further, the frame synchronization unit 21 needs to execute the series of operation at a shorter cycle than the cycle of referring to the frame in the frame processing unit 22. For example, in the case where the frame processing unit 22 is an encoder with output of 5 FPS (Frame Per Second), the latest decoded frame cannot be encoded unless performing transfer at a cycle of 200 milliseconds or shorter.

According to the exemplary embodiment, because the frame synchronization unit 21 performs transfer processing of the frame data as described above, it is possible to avoid competition which occurs between the decoding unit 20 and the frame processing unit 22 and between the plurality of frame processing unit 22 when accessing the memory that stores frame data. This eliminates queuing between the frame processing unit 22 when making an access to the memory that stores the frame data, for example. The frame processing unit 22 can thereby dedicate itself to the frame processing, which is its primary processing, thereby allowing improvement of the performance by a stable operation.

Further, by reducing transfer of non-compressed image data with a large amount of information to the smallest possible, it is possible to reduce the traffic load in transmission within the system. This can be achieved by reducing the amount of information of transfer data by differential information extraction, for example. In this manner, by avoiding access competition or reducing the amount of information to be transferred, it is possible to reduce the processing load of accessing the memory that stores the frame data.

[Second Exemplary Embodiment]

Although the case where the data decoding processing section 200 includes a plurality of decoding unit 20 is described in the first exemplary embodiment, the data transfer scheme and method of the present invention may be applied also to the case where the data decoding processing section 200 includes a single decoding unit 20. Specifically, if the number of input moving image data is one, one decoding unit 20 decodes the input moving image data and generates frame data. An example of such a case is when a plurality of frame processing units 22 performs flame processing on moving image data of a conference, a lecture or the like that is held in one place so as to manipulate the data into specifications (formats) according to distribution destinations. In this case also, it is possible to avoid competition of access to the frame data between the decoding unit 20 and the plurality of frame processing unit 22 and between the plurality of frame processing unit 22. It is also possible to reduce the amount of information to be transferred.

Further, although the case where the manipulation processing section 220 includes a plurality of frame processing unit 22 is described in the first exemplary embodiment, the data transfer scheme and method of the present invention may be applied also to the case where the manipulation processing section 220 includes a single frame processing unit 22. Specifically, this is a case where one frame processing unit 22 performs flame processing of a plurality of input moving image data. An example of such a case is when distributing data to a single distribution destination, or when distributing data of the same specifications to a plurality of destinations. In this case also, it is possible to avoid competition of access to the frame data between the plurality of decoding unit 20 and the frame processing unit 22. It is also possible to reduce the amount of information to be transferred.

Furthermore, the present invention may be applied to the configuration that includes one decoding unit 20 and one frame processing unit 22. In this case also, it is possible to avoid competition of access to the frame data between the decoding unit 20 and the frame processing unit 22. It is also possible to reduce the amount of information to be transferred.

[Third Exemplary Embodiment]

In the first exemplary embodiment, the procedure when the frame synchronization unit 21 reads the frame update information from the update information memory 205 of the decoding unit 20 is described. However, the decoding unit 20 (e.g. the update information generation unit 204) may transmit the frame update information to the frame synchronization unit 21 after the update information generation unit 204 of the decoding unit 20 generates the frame update information. The frame synchronization unit 21 may include a first-in first-out (FIFO) buffer, for example, and process the frame update information in the sequence of receiving them to thereby update the frame update information held by the frame processing unit 22.

Further, FIG. 4 shows an example of the items of the frame update information, and the frame update information is not limited to have such items. Further, the frame update information is not necessary to have all of the four items described above, as long as it at least has the item "data" (update data). For example, in the case where there is only one input moving image data, the data transfer scheme and method according to the present invention can be implemented without setting the "identifier". Further, in the case where the frame synchronization unit 21 transfers the frame data from the decoding unit 20 to the frame processing unit 22 each time, the "type" is not necessary. The "type" is also not necessary in the case where the kind of information transferred from the frame synchronization unit 21 is one. Furthermore, in the case where the frame synchronization unit 21 receives either one of frame data or update data from the decoding unit 20 and transfers the received frame data or update data to the frame processing unit 22, the "update status" is not necessary. The update information memory may have an area that stores a necessary item as the frame update information according to various circumstances. Further, another item such as information indicating the level of update status may be included in addition to the items shown in FIG. 4.

[Fourth Exemplary Embodiment]

The update information generation unit 204 included in the decoding unit 20 is not limited to the one that performs differential extraction using the latest frame data and the previous frame data as described in the first exemplary embodiment, as long as it can provide information that allows the frame data held by the frame processing unit 22 to be updated to the latest frame data. Thus, the frame data can be transmitted every time. In such a configuration, the decoding unit 20 may include a single frame memory.

In the first exemplary embodiment, the case where the decoding unit 20 includes two frame memories that respectively store the latest frame data and the previous frame data and generates the frame update information by using the two frame data is described. The present invention, however, is not limited thereto and also applicable to the case of transmitting the frame data itself (or compressed data) when the frame data is updated without generating the frame update information, for example. In this case, the amount of data to be transferred would increase compared to the case of transferring the difference information. However, by applying the exemplary embodiment of the present invention, access competition to the frame data is avoided between the decoding unit 20 and the frame processing unit 22 or between the plurality of frame processing unit 22. Further, depending on circumstances of a change in the input moving image data (i.e. timing of a change), in the case where the input moving image data is changed at given intervals, the decoding unit 20 may have a flag that indicates update of frame data, and the frame synchronization unit 21 may refer to the flag. This enables reduction of the number of times when the frame synchronization unit 21 transfers the frame data. This is effective when displaying images by switching still images at predetermined intervals like a slide show, for example.

[Fifth Exemplary Embodiment]

In the first exemplary embodiment, it is assumed that the frame processing unit 22 includes the (N+1) number of frame memory 223. However, the number of frame memory 223 included in the frame processing unit 22 may correspond to the number of input moving image data to be used among the (N+1) number of input moving image data. In this case, the number of frame update information 72 shown in FIG. 4 may also correspond to the number of frame memory 223. Thus, the update information memory 221 may store the frame update information corresponding to the number of frame memory 223 to be used in association with the identifier.

If the frame processing unit 22 does not store all of the frame update information, the frame synchronization unit 21 reads the identifier stored in the update information memory 221 of the frame processing unit 22 and then transfers the transfer data stored in the update information memory 221 which matches the identifier to the frame processing unit 22. Alternatively, the frame synchronization unit 21 may store the identifier of the frame data to be used by each frame processing unit 22 in the temporary memory 211. This reduces the amount of information of the transfer data. Further, it is possible to reduce the storage areas of the frame memory 223 and the update information memory 221 in the frame processing unit 22.

[Sixth Exemplary Embodiment]

Figure 9:
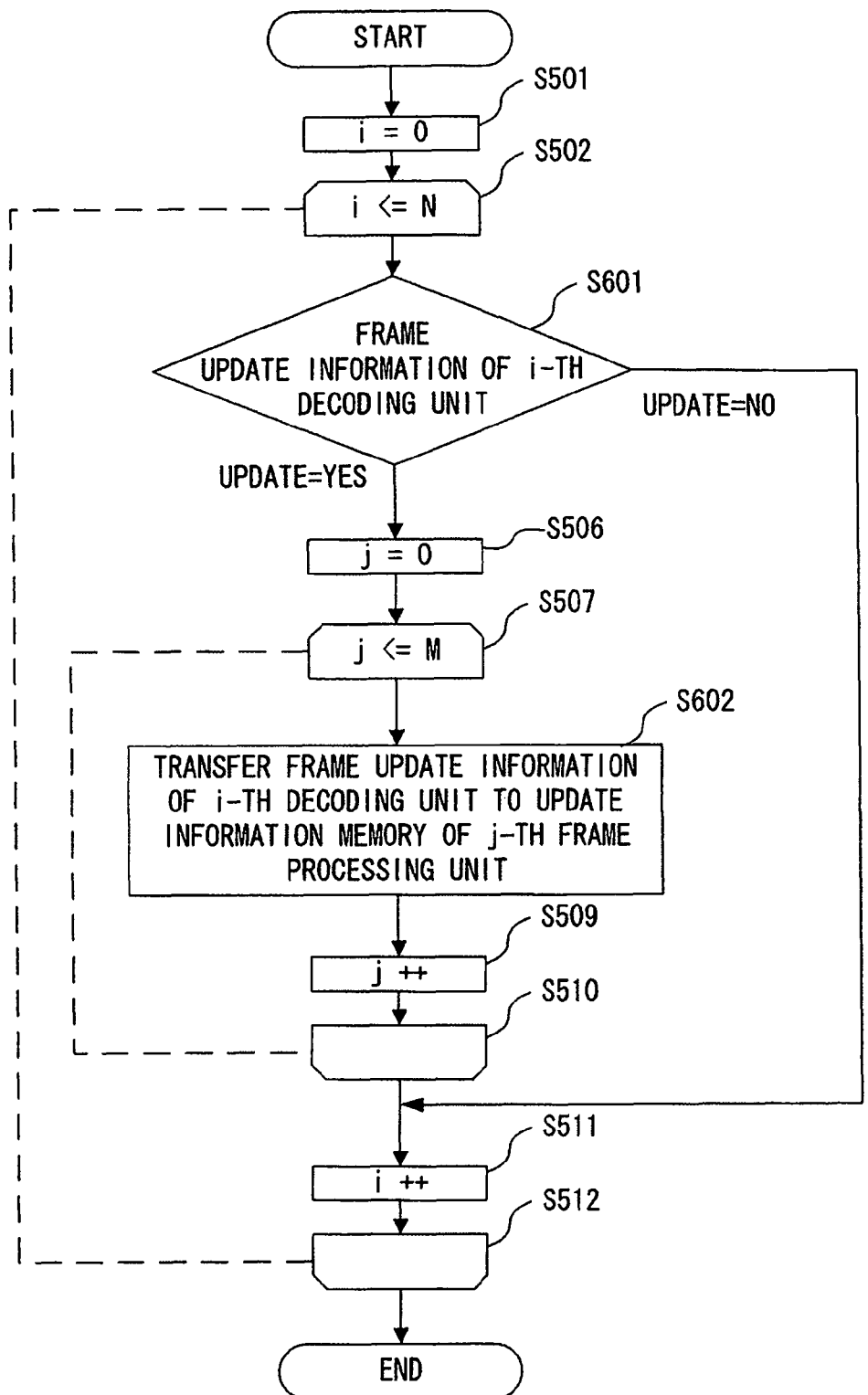
FIG. 9 is a flowchart showing an exemplary operation of a frame synchronization unit according to a sixth exemplary embodiment of the present invention.
Figure 10:
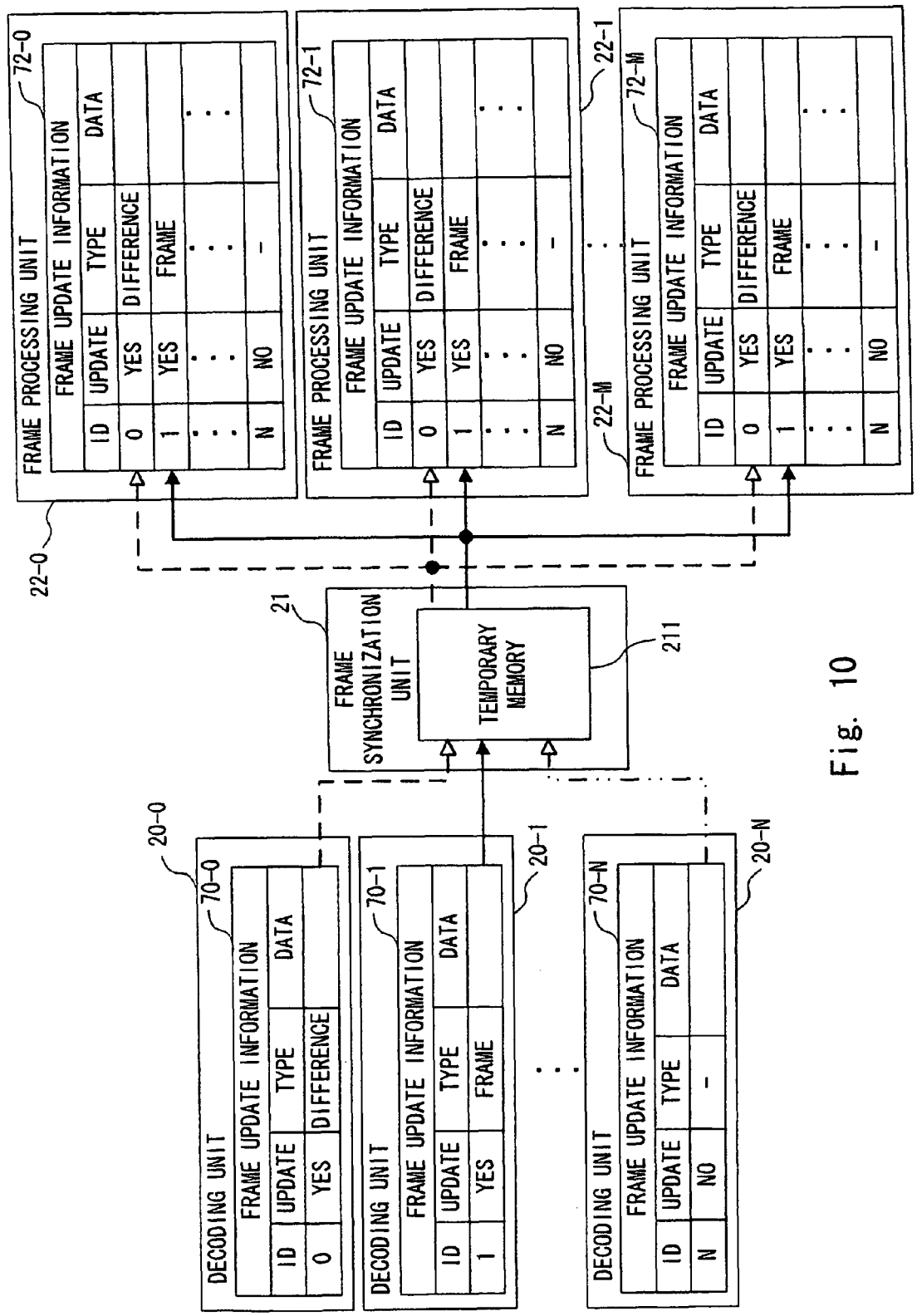
FIG. 10 is a view showing an example of update of frame update information according to the sixth exemplary embodiment.
Figure 11:
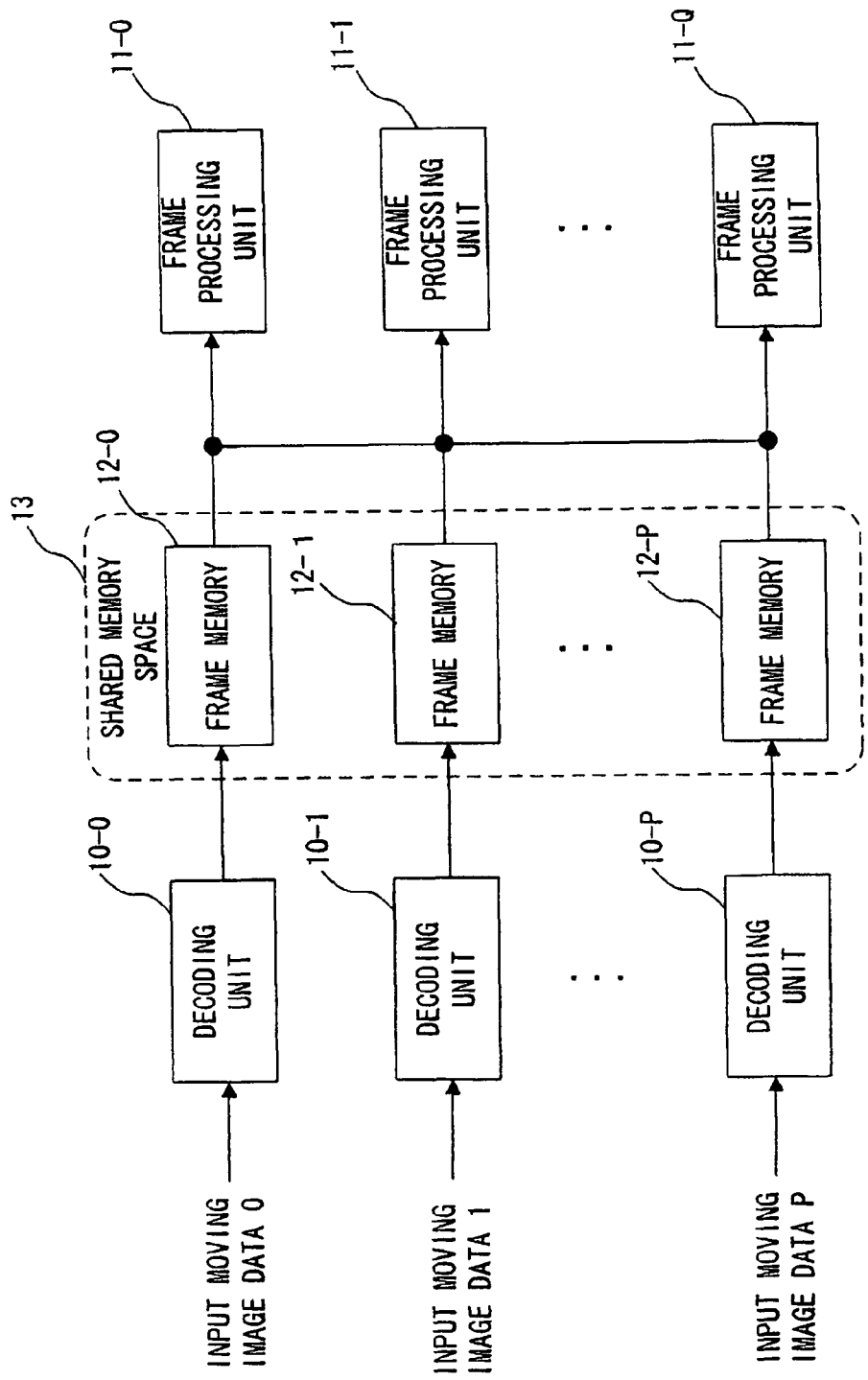
FIG. 11 is a view showing an exemplary configuration of a real-time moving image processing system according to related art.

Although the case where the frame synchronization unit 21 generates the transfer data from the frame update information according to whether the "update status" is Yes or No and transfers the transfer data to the frame processing unit 22 is described in the first exemplary embodiment, the frame synchronization unit 21 may transfer the transfer data only when the "update status" is Yes. FIG. 9 shows a flowchart of an example of the operation when the frame synchronization unit 21 transfers the frame update information only when the "update status" is Yes. The processing of the steps denoted by the same reference symbols as in FIG. 7 is the same as that described in the first exemplary embodiment. FIG. 10 shows transfer of frame update information. As shown in FIG. 10, the frame synchronization unit 21 reads the frame update information from each decoding unit 20. The frame synchronization unit 21 transfers the frame update information with the identifier of 0 or 1 to the frame processing unit 22 because their "update status" is Yes, and it does not transfer the frame update information with the identifier of N because its "update status" is No.

Specifically, in FIG. 9, the frame synchronization unit 21 performs the operation of transferring the frame update information to each frame processing unit 22 when the "update status" is Yes (Update=Yes in S601) (S506 to S510). In the step S602, the frame synchronization unit 21 transfers the "update status", "type" and "data" to the frame processing unit 22. In this case, because the frame update information associated with the identifier with the "update status" of No is not rewritten, the frame processing unit 22 needs to clear the "update status" stored in the update information memory 221. For example, the frame update unit 222 clears the "update status" (e.g. sets it No) after updating the frame data of the frame memory 223 with use of the frame update information. This avoids updating the frame data again with the same information after updating the frame data based on the frame update information once written to the update information memory 221. In this case, while processing in the frame processing unit 22 increases, the amount of information transferred to the frame processing unit 22 by the frame synchronization unit 21 decreases.

(Other Exemplary Embodiments)

The present invention may be applied to a videoconference system, for example. For instance, the system may include the decoding unit 20 and the frame processing unit 22 that are located in a dispersed manner on the network. Each decoding unit 20 decodes the input moving image data that is captured in each location and encoded. The frame processing unit 22 that uses the input moving image data manipulates the plurality of input moving image data captured in the respective locations, generates output moving image data and distributes the data.

Further, application of the present invention is not limited to the system where the decoding unit 20 and the frame processing unit 22 are located in a dispersed manner on the network. The present invention may be also applied to a system (device) where the decoding unit 20 and the frame processing unit 22 are incorporated into one computer, for example.

Furthermore, with regard to the storage area that stores frame data in the data transfer scheme and method according to the exemplary embodiment of the present invention, a first memory that store frame data and a second memory different from the first memory are placed, and the frame synchronization unit 21 transfers the frame data from the first memory to the second memory. The first memory corresponds to the frame memory (the first frame memory 202, the second frame memory 203) placed in the decoding unit 20, and the second memory corresponds to the frame memory 223 placed in the frame processing unit 22.

Specifically, the data transfer scheme and method perform the following operation. Firstly, the decoding unit 20 stores frame data generated by decoding encoded video data into the first memory and updates the frame data stored in the first memory in response to newly input video data. The frame synchronization unit 21 transfers the frame data stored in the first memory to the second memory different from the first memory. The frame processing unit 22 manipulates the frame data stored in the second memory. Further, the frame synchronization unit 21 transfers update data that is used for update of the frame data stored in the second memory to the second memory. With use of the update data, the frame processing unit 22 updates the frame data stored in the second memory to the same frame data as the frame data stored in the first memory.

Although the case of inputting the input moving image data and outputting the output moving image data is described in the above exemplary embodiments, the present invention is not limited to the case of inputting and outputting the moving image data. The present invention may be applied to a system that treats bitmap data such as video data, image data or photographs having a larger amount of information than text data or the like. For example, the present invention may be applied to a data transfer scheme that inputs and outputs a plurality of still image data. In this case also, it is possible to avoid competition occurring when accessing data. For example, in the data transfer scheme that receives a plurality of encoded still image data as input, decodes the plurality of still image data, performs manipulation using all or some of the plurality of still image data and outputs the still image data, it is possible to avoid competition of access to the decoded still image data. Particularly, in the data transfer scheme that receives still image data at regular cycles and outputs decoded and manipulated still image data, it is possible to avoid competition of access to the decoded still image data. This enables reduction of the processing load of access to still image data.

Further, the functions implemented by the decoding unit 20, the frame synchronization unit 21 and the frame processing unit 22 described in the above exemplary embodiments may be realized with use of a program. The program is loaded to a computer memory and executed under control of a central processing unit (CPU). Further, the program is recorded on a computer-readable recording medium. For example, the program that realizes the function of the frame synchronization unit 21 (frame synchronization device) implements frame synchronization processing that transfers frame data between the frame decoding unit 20 (decoding device) that receives encoded video data, decodes the video data to generate frame data and stores the frame data and the frame processing unit 22 (frame processing device) that stores the frame data decoded by the decoding unit 20 and manipulates the frame data. The program at least includes the following processing: (1) processing of transferring the frame data stored in the decoding unit 20 to the frame processing unit 22; (2) processing of detecting update of the frame data stored in the decoding unit 20 in response to video data newly input to the decoding unit 20; and (3) processing of transferring update data to be used for update of the frame data stored in the frame processing unit 22 to the frame processing unit 22 in response to a detected update status.

As described above, the data transfer scheme and method according to any one of the exemplary embodiments of the present invention provides the technique of avoiding competition of access to the memory that stores frame data. Specifically, a dedicated frame memory is placed in each of the decoding unit and the frame processing unit, without employing a scheme of accessing a shared memory. Further, the data stored in the respective frame memories are synchronized by the frame synchronization unit. Transfer of the frame data or the update information of frame data is performed in series by the frame synchronization unit that is independent of the decoding unit and the frame processing unit, and it is thereby possible to avoid competition due to multiple accesses to the memory that stores the frame data. Further, the decoding unit and the frame processing unit can thereby use their own local memory areas only without consideration of transfer of the frame data and thus dedicate themselves to their primary processing (e.g. decoding and frame processing, respectively).

Further, the data transfer scheme and method according to any one of the exemplary embodiments of the present invention provides the technique of reducing transmission load. Specifically, the frame data transferred from the decoding unit to the frame processing unit is only difference information between a transfer source frame and a transfer destination frame, and the frame processing unit reconstructs the frame based on the difference information. It is thereby possible to transfer non-compressed image data having a large amount of data without any loss even in a narrow band. It is also possible to reduce the amount of information transmitted between the decoding unit and the frame processing unit.

More specifically, the frame processing unit performs manipulation on the decoded frame data. Thus, the data flowing through a transmission line from the decoding unit to the frame processing unit is non-compressed image data having a large amount of information. Further, because there is a possibility that use of frame (frame processing) varies by the frame processing unit, it is necessary that the data output from the decoding unit can be treated by all the frame processing units. Due to such a large amount of information, if the transmission line does not have a sufficient band (transmission capacity), the band is the bottleneck that limits the number of decoding units and frame processing units even if each processing unit has a high processing capacity. Further, degradation of services can occur due to a delay owing to heavy load. Such issues can be solved by performing transmission of the frame data in the frame synchronization unit 21.

As described in the foregoing, the data transfer scheme and method according to the exemplary embodiment of the present invention enables reduction of processing load for memory access and reduction of traffic load for transfer by compressing information for efficient transmission of video data in the system that treats video data with a large amount of information.

Each of the above-described embodiments can be combined as desirable by one of ordinary skill in the art.

According to the exemplary embodiments of the present invention, it is possible to reduce the processing load for accessing video data.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A data transfer scheme comprising:
at least one decoding unit that receives encoded video data as input, generates frame data by decoding the video data, stores the frame data and updates the stored frame data in response to newly input video data;
at least one frame processing unit that stores the frame data decoded by the decoding unit and manipulates the frame data; and
a frame synchronization unit that transfers the frame data stored in the decoding unit to the frame processing unit and transfers update data to be used for update of the frame data stored in the frame processing unit to the frame processing unit in response to update of the frame data stored in the decoding unit.

2. The data transfer scheme according to claim 1, wherein
the decoding unit generates latest frame data by decoding newly input video data, stores previous frame data decoded last time and the latest frame data, generates update data to be used for update to the latest frame data from the previous frame data and stores the update data,
the frame synchronization unit transfers the update data to the frame processing unit, and
the frame processing unit updates the frame data stored in itself by using the update data.

3. The data transfer scheme according to claim 2, wherein the decoding unit comprises:
a decoding-side frame memory that stores the latest frame data and the previous frame data;
a decoding processing unit that generates the latest frame data by decoding the newly input video data and stores the latest frame data into the decoding-side frame memory;
an update information generation unit that compares the latest frame data and the previous frame data and generates the update data based on a comparison result; and
a decoding-side update information memory that stores the update data.

4. The data transfer scheme according to claim 3, wherein the frame processing unit comprises:
a processing-side update information memory that stores the update data transferred from the frame synchronization unit;
a processing-side frame memory that stores the frame data decoded by the decoding processing unit;
a frame update unit that updates the frame data stored in the processing-side frame memory based on the update data; and
a frame manipulation unit that performs frame manipulation by using the frame data stored in the processing-side frame memory.

5. The data transfer scheme according to claim 4, wherein
the decoding-side update information memory further stores an update status indicating whether the frame data stored in the decoding-side frame memory is updated or not,
the update information generation unit sets the update status to No if the previous frame data and the latest frame data match and sets the update status to Yes if the previous frame data and the latest frame data do not match, stores the update status into the decoding-side update information memory, generates the update data if the update status is Yes, and stores the update data into the decoding-side update information memory, and
the frame synchronization unit reads the update status stored in the decoding-side update information memory, determines whether the frame data stored in the decoding-side frame memory is updated or not based on the update status, and writes the update data into the processing-side update information memory based on a determination result.

6. The data transfer scheme according to claim 5, wherein
the update information generation unit extracts a difference between the previous frame data and the latest frame data and generates the update data by using the extracted difference, and
the frame update unit reconstructs the frame data stored in the processing-side frame memory by using the difference contained in the update data.

7. The data transfer scheme according to claim 6, wherein the frame synchronization unit transfers the update status and the update data to the frame processing unit if the determination result of the update status is Yes, and transfers the update status to the frame processing unit if the determination result of the update status is No, and the processing-side update information memory further includes an area for storing the update status and stores the update data and the update status in association with each other.

8. The data transfer scheme according to claim 6, wherein the decoding-side update information memory further stores a type indicating whether the update data is difference or frame data, the update information generation unit sets the type as difference and generates the update data by using the difference if the extracted difference is smaller than a prescribed value, sets the type as frame and generates the update data by using the frame data if the extracted difference is larger than the prescribed value, and stores the update data and the type, the processing-side update information memory further includes an area for storing the type, the frame synchronization unit writes the update data and the type into the processing-side update information memory, and the frame update unit replaces the frame data stored in the processing-side frame memory with the update data if the type is frame data.

9. The data transfer scheme according to claim 5, wherein the at least one decoding unit comprises a plurality of decoding units, each decoding unit receives different descriptions of video data as input, the decoding-side update information memory stores an identifier that identifies the decoding unit of its own in association with the update status and the update data, the frame synchronization unit searches the decoding-side update information memory included in each decoding unit, extracts the update data associated with the identifier with the update status of Yes and transfers the extracted update data in association with the identifier to the frame processing unit, the processing-side update information memory further includes an area for storing the identifier and stores the update data and the identifier in association with each other, and the processing-side frame memory stores at least one frame data decoded by each decoding unit in association with the identifier.

10. The data transfer scheme according to claim 9, wherein the frame update unit updates the frame data stored in the frame synchronization unit by using the update data associated with the identifier, and the frame synchronization unit reads the identifier stored in the processing-side update information memory and rewrites the update data of the decoding unit corresponding to the identifier.

11. The data transfer scheme according to claim 5, wherein the at least one frame processing unit comprises a plurality of frame processing units, the frame manipulation unit included in each frame processing unit performs a different kind of manipulation according to manipulation specifications, the processing-side frame memory included in each frame processing unit stores at least one frame data according to the manipulation specifications, the processing-side update information memory included in each frame processing unit stores the identifier associated with the frame data stored in the processing-side frame memory of its own, and the frame synchronization unit reads the identifier stored in the processing-side update information memory of each frame processing unit and rewrites the update data of the decoding unit corresponding to the identifier.

12. The data transfer scheme according to claim 1 wherein the at least one frame processing unit comprises a plurality of frame processing units, and the frame synchronization unit transfers the update data to each frame processing unit.

13. The data transfer scheme according to claim 1, wherein the frame synchronization unit detects whether the frame data of the at least one decoding unit is updated or not and transfers the update data to the frame processing unit before timing when the frame processing unit manipulates the frame data.

14. The data transfer scheme according to claim 1, wherein the at least one decoding unit, the at least one frame processing unit and the frame synchronization unit are connected through a network.

15. A frame synchronization device, comprising:

a frame synchronization unit that transfers frame data between a decoding device that receives encoded video data as input, generates frame data by decoding the video data and stores the frame data and a frame processing device that stores the frame data decoded by the decoding device and manipulates the frame data, wherein the frame synchronization unit transfers the frame data stored in the decoding device to the frame processing device, detects update of the frame data stored in the decoding device in response to video data newly input to the decoding device, and transfers update data to be used for update of the frame data stored in the frame processing device to the frame processing device in response to a detected update status.

16. A data transfer method comprising:

storing frame data generated by decoding encoded video data into a first memory;

updating the frame data stored in the first memory in response to newly input video data;

transferring the frame data stored in the first memory to a second memory different from the first memory;

manipulating the frame data stored in the second memory; and transferring update data to be used for update of the frame data stored in the second memory to the second memory in response to update of the frame data stored in the first memory.

17. The data transfer method according to claim 16, wherein the frame data stored in the second memory is updated to frame data being the same as the frame data stored in the first memory by using the update data.

18. A non-transitory, computer-readable recording medium that records a program to implement frame synchronization processing that transfers frame data between a decoding device that receives encoded video data as input, generates frame data by decoding the video data and stores the frame data and a frame processing device that stores the frame data decoded by the decoding device and manipulates the frame data, the program causing a computer to execute processing comprising:

transferring the frame data stored in the decoding device to the frame processing device;

detecting update of the frame data stored in the decoding device in response to video data newly input to the decoding device; and transferring update data to be used for update of the frame data stored in the frame processing device to the frame processing device in response to a detected update status.

19. A data transfer scheme comprising:

at least one decoding means for receiving encoded video data as input, generating frame data by decoding the video data, storing the frame data and updating the stored frame data in response to newly input video data;

at least one frame processing means for storing the frame data decoded by the decoding means and manipulating the frame data; and a frame synchronization means for transferring the frame data stored in the decoding means to the frame processing means and transferring update data to be used for update of the frame data stored in the frame processing means to the frame processing means in response to update of the frame data stored in the decoding means.

* * * * *